United States Patent [19]
Barrus

[11] Patent Number: 5,990,896
[45] Date of Patent: Nov. 23, 1999

[54] RAPID AND EFFICIENT TERRAIN SURFACE FINDING SYSTEM

[75] Inventor: John W. Barrus, Menlo Park, Calif.

[73] Assignee: Mitsubishi Electric Information Technology Center America, Inc. (ITA), Cambridge, Mass.

[21] Appl. No.: 08/723,018

[22] Filed: Sep. 30, 1996

[51] Int. Cl.[6] .................................................. G06T 15/10
[52] U.S. Cl. ......................... 345/420; 345/421; 345/427
[58] Field of Search .................................. 345/419, 420, 345/421, 433, 427

[56] References Cited

U.S. PATENT DOCUMENTS

| | | | |
|---|---|---|---|
| 4,694,404 | 9/1987 | Meagher | 345/421 |
| 4,868,771 | 9/1989 | Quick et al. | 345/419 X |

*Primary Examiner*—Mark K. Zimmerman
*Attorney, Agent, or Firm*—Dirk Brinkman

[57] ABSTRACT

A system for quickly finding a point in a virtual environment "on the ground" or beneath another point involves finding the intersection of a "ground" polygon representing the terrain with a single ray representing the direction of gravity emanating from the original point. After appropriate polygons are selected, they are intersected with the gravity vector to determine which ones are just under the point in question, with the closest point being returned as the ground point. Polygons are sorted into a variable depth quadtree structure, where the leaves contain a predetermined maximum number of polygons, with each quadtree node being subdivided based on a polygon vertex located inside the current quadtree node. A planar space subdivision of each quadtree node is created using the edges of the polygons that overlap that node. The system for rapid ground point determination intersects lines of a predetermined orientation, e.g., gravity, with a terrain model and uses a preprocessing step that reduces the 3D terrain to a 2D projection and then sorts terrain polygons into a quadtree, followed by adding bounding boxes and polygon edge parameters to speed up polygon containment checking.

8 Claims, 13 Drawing Sheets

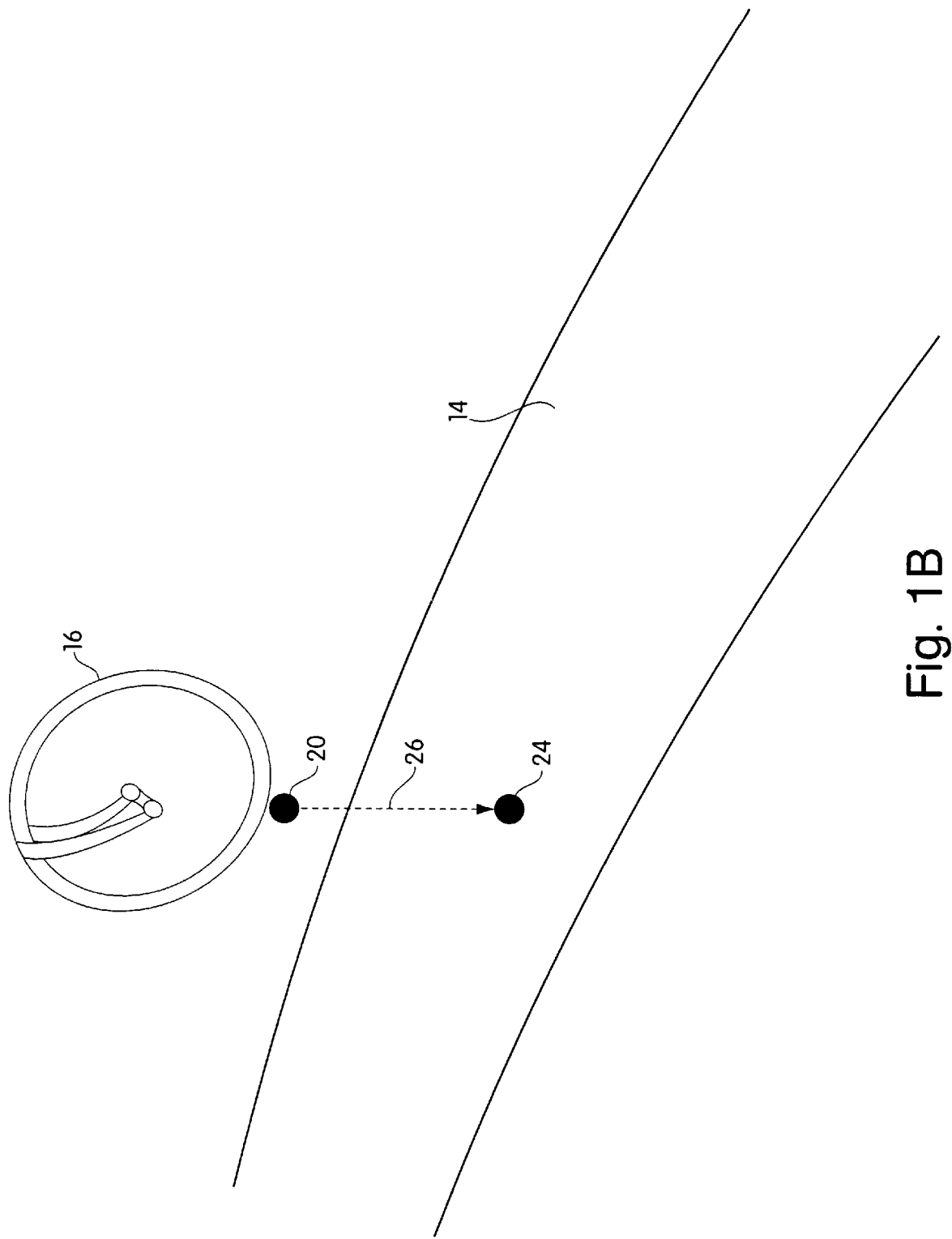

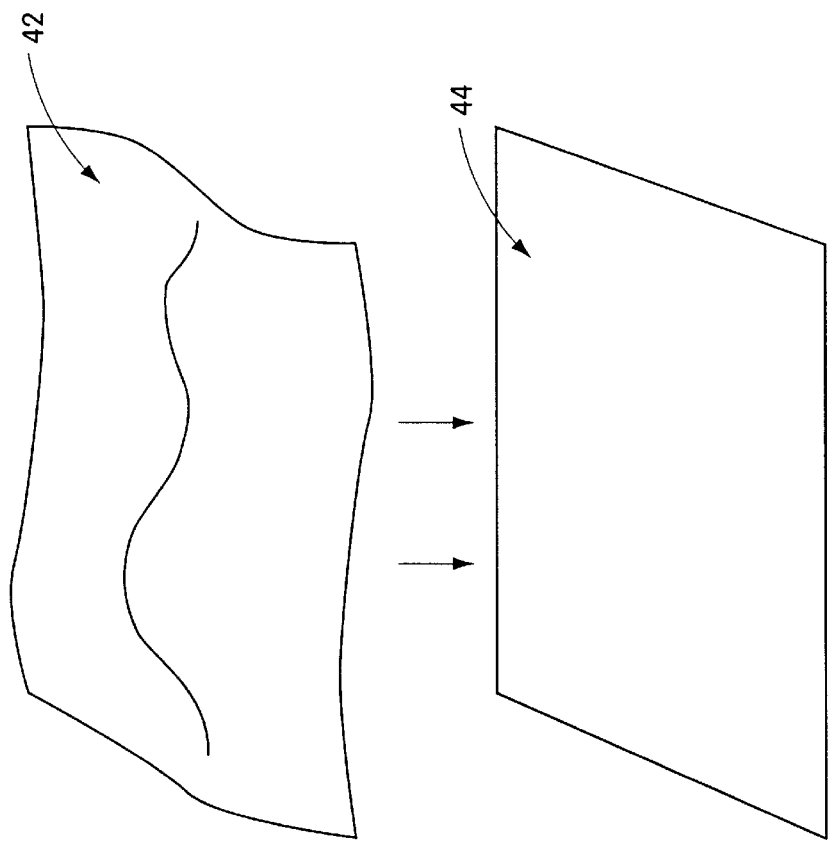

RAPID AND EFFICIENT TERRAIN SURFACE FINDING SYSTEM

BACKGROUND OF THE INVENTION

Frequently, in a virtual environment, it is important to place objects like vehicles or pedestrians on the ground or to keep them on the ground as they move. Keeping them on the ground makes the environment seem more realistic.

More particularly, virtual environments are frequently designed to reflect the real world. Although gravity is not usually simulated in virtual environments, it is often desirable to keep moving objects and people on the ground to approximate the effects of gravity. While many virtual environment designers simplify the task of keeping things on the ground by using a flat ground plane, a hilly terrain can create a more interesting experience for the user. Note that for a virtual environment with 10 people roaming freely on a hilly terrain, this environment would require approximately 1200 (10 people×30 frames per sec×2 pts per foot front and back=1200) intersection calculations per second, leaving less than 1 millisecond for each intersection calculation. Of course, the actual calculation must take only a fraction of that time or the computer has no time left over to draw the graphics representing the environment on the screen. By way of example, it would be useful if each calculation took less than 20 usecs per point while examining tens of thousands of polygons. Note that 20 usecs corresponds to less than 3% of the computing power for the scenario involving 10 people in a single virtual environment.

As an example of virtual environments for which locating the ground is important, Diamond Park, a large and complex virtual reality environment, contains over 55,000 polygons. About 13,500 of those are terrain polygons. Note that terrain polygons are ground polygons which represent surfaces for moving around the environment. Bicyclists, unicyclists, and an acrobat and pedestrians all are to appear as if they were on the ground. This requires continuously calculating the location of the ground for each part of each object as it moves. Bikes require 4 ground intersections per frame and move at about 20 frames per second adding up to 80 calculations per second per bike.

The key to providing fast ground point calculation is to precalculate as much as possible and organize the polygons in a way that allows quick reduction in the number of floating point operations required to find the intersection point.

Knowing that a comparison operation can be an order of magnitude faster than a multiply or divide, e.g., 4 cycles for 1 compare operation, 16 cycles for 1 multiply, and 73 cycles for 1 divide on a 486 processor, even with hardware acceleration, polygons must be sorted by location before any intersection calculations are performed.

SUMMARY OF INVENTION

In order to provide for quick terrain surface finding, the present invention is a method of organizing the polygons representing the ground in a virtual environment to provide a fast means for calculating a point on the ground beneath any point in the entire virtual environment, with average calculation times on the order of 20 usecs, and maximum times of about 40 usecs per point for a one mile square terrain made of about 13,500 polygons.

In one embodiment, the subject system moves the graphical object to the appropriate position in the virtual reality scene by establishing a gravitational vector through the lower-most point on the graphical object and calculating its intersection with the plane of the appropriate polygon. The ability to do this efficiently is of paramount importance, as analyzing some 13,500 polygons in a typical case on a polygon by polygon basis would require as much as a minute for each frame of the virtual reality scene.

The reason this task is normally quite difficult is as follows. Without additional information, it is not readily apparent where a point moving along the gravitational vector will first intersect the terrain. The terrain is made up of many different polygons. In order to find out which one will be hit first by the moving point, one must project a line through the point in the direction of gravity and calculate the intersection of that line with all of the polygons in the scene. Such requires several mathematical steps that include about eight multiplications and 16 additions per polygon.

Note that, in general, all of the polygons are carried in computer memory in no apparent order. By first grouping polygons into quadrants one can bring spatially related polygons together. This ordering then permits a correlation between the gravity vector and a given area such that only those polygons in that area are analyzed to ascertain whether or not the gravity vector intersects them. Moreover, by rotating the terrain in accordance with the preferred direction, gravity in this case, and projecting the three dimensional terrain onto a two dimensional plane, one can use a simple structure for associating spatially close polygons with one another and access groups of associated polygons quickly.

Without the ability to make the calculations so quickly, it would be impossible to represent an interesting terrain. As a result, virtual environment designers would be limited to either flat terrain or terrain that could be represented using simple mathematical functions.

More specifically, to keep cars, bicycles, and people on the ground in virtual environments, it is necessary to find the points on the ground underneath tires and feet very quickly. In the subject system a method of pre-processing terrain polygons is used in virtual environments which reduces the calculation time of the ground intersection points. The pre-processing consists of sorting the polygons into a quadtree and adding bounding boxes and polygon edge equation parameters to speed up containment checking. The subject algorithm has been found to be 40–80 times faster than some widely-used general purpose collision detection algorithms. The terrain following algorithm can also be used for keeping objects within user-specified bounds and for limited collision detection.

In order to sort polygons, the system starts with a pre-calculation step when the terrain is initially loaded into memory from a file. After the pre-processing, a program can call the terrain following routine every frame or as often as necessary. Note that all of the pre-processing can be saved to a file which would eliminate per-load pre-processing.

The pre-computation starts with a file containing a list of convex ground polygons for a virtual environment, VE. There are no topological requirements for the convex polygons. For instance, they can overlap and contain gaps. A virtual environment containing a lake might have the polygons which represent the lake removed in order to prevent someone from entering the lake while traversing the environment.

In one embodiment, the user provides a gravity vector, the direction in which all objects will fall toward the terrain. Since gravity operates in a single direction, the entire list of polygons is transformed until the transformed gravity vector is aligned with the negative Z axis. This transform T is calculated using the gravity vector specified by the user. The inverse, $T^{-1}$, is also calculated and saved. T and $T^{-1}$ are used to convert back and forth from the virtual environment coordinate system to the terrain following coordinate system. This coordinate transformation is essential because it allows the intersection problem to be reduced from three down to two dimensions. Once all of the polygons have been transformed to the new coordinate system, the Z values of the vertices can be ignored, thus projecting the polygons onto the xy plane, until the final gravity vector- polygon intersection check.

The next step in the process is to build a quadtree structure in which the leaves of the quadtree contain only the polygons that overlap the area enclosed by the quadtree leaf. Quadtrees are described in detail in a publication: [Foley 90] Foley J, van Dam A, Feiner S, Hughes J (1990) Computer Graphics-Principals and Practice, Addison Wesley, Reading Mass. pp.550–554.

For terrain following, each quadtree node has the following data:

TABLE 1

Data stored in quadtree node

| Data | Notes |
|---|---|
| Parent | Pointer to parent (for convenience) |
| Child | Pointers to children |
| Root | Pointer to root node (for convenience) |
| NumPolys | Number of polygons in this leaf |
| PolyList | Array of pointers to polygons which overlap this leaf |
| bBox | bounding box (dimensions) for this quadtree node |
| pBox | bounding box for polygons in this node |
| xdiv, ydiv | x and y division points for traversing to child nodes |

Starting with all of the polygons in a single node, the root node, the list of vertices is traversed and minimum and maximum x and y values are determined. These are stored in bBox and pBox, which now contain the extent of the entire polygon list. An x and y value are chosen to divide the list into quadrants and stored in xdiv and ydiv. In one embodiment, this division is chosen to be the halfway point of the min's and max's contained in bBox. Next, the list of polygons contained in this node is traversed and each polygon is assigned to one or more quadrants.

A polygon completely within the bounding box of a single child node is simply moved to the list of polygons in that child. Polygons overlapping multiple children will be added to the lists of all of those children. In the worst case, a polygon containing the x,y subdivision point of the parent node will be added to every child node. This gives rise to the recognition that moving the x,y division point to align with a vertex will reduce the number of polygons shared by multiple quadtree leaves. As polygons are added to a node, pBox, the bounding box that represents the axis-aligned bounds of all the polygons in a node, is extended.

After all of the polygons have been moved to the appropriate child, the parent quadtree node is now an internal node and references no polygons. It is used only for traversing the tree.

One of the options specified by the user when building the quadtree is the maximum number of polygons in each leaf. The above traversal continues until each leaf has the same or fewer polygons than the number requested by the user. Typical requested numbers are in the range 6–20. Larger numbers reduce the final depth of the tree, but require more processing at the leaf during terrain following. However, smaller numbers are much harder to achieve. For instance, if a single vertex is used by 7 different polygons, the quadtree leaf containing that vertex will never have fewer than 7 polygons. If, when creating children, it is found that every child contains all of the polygons that were originally contained in the parent, the children are deleted and the parent becomes the leaf of this part of the quadtree even if the number of polygons in the parent is greater than the number requested by the user.

This process does not create a constant depth quadtree. Areas with many small polygons have more quadtree leaves than those with larger polygons. However, as one can see from Table 2, following the quadtree nodes down to the leaves is much quicker than checking individual polygon containment and so it is beneficial to eliminate as many polygons as possible from the list before starting to check individual polygons.

TABLE 2

Number of floating operations per calculation for terrain following.

| Operation | compares | adds | multiplies | sqrt, sin, cos |
|---|---|---|---|---|
| find correct quadtree child | 2 | 0 | 0 | 0 |
| bound box containment | 1 to 4 | 0 | 0 | 0 |
| half plane containment | 1 | 2 | 2 | 0 |
| 2D polygon containment | 1 to 3 | 2 to 6 | 2 to 6 | 0 |
| general projection to plane | 0 | 8 | 16 | 1 |
| special projection to XY plane | 0 | 2 | 2 | 0 |

Once all of the polygons have been sorted into the correct quadtree nodes, additional pre-calculations are done to speed up the polygon containment check. The data stored with each polygon is shown in Table 3.

TABLE 3

Polygon data structure.

| Data | Notes |
|---|---|
| Vertices | List of vertices |
| Num Verts | Number of vertices for this polygon |
| Lines | 2D line equations representing poly edges |
| pBox | Bounding box for polygon |
| plane | Equation of plane containing polygon |

There are (numverts—1) line equations of the form Ax+B+C. The first line is defined as the line containing the edge between $V_0$ and $V_1$. When the coordinates (x,y) of a point are plugged into that equation, the result is either zero, which indicates the point is on the line, or positive or negative, indicating that the point is on the outside or inside of the polygon. The polygon is defined as the intersection of the negative regions defined by all the line equations for that polygon. A positive value calculated with any of the line equations for a single polygon indicates that the point is not contained in the polygon. This calculation only works for convex polygons and therefore concave polygons must be broken up into convex regions before using this method of containment checking. The equations below show how to calculate the line equations based on $V_0$ and $V_1$.

$$result = Ax + By + C$$

$A = y_2 - y_1 \quad B = x_1 - x_2 \quad C = x_2y_1 - x_1y_2$
$V_0 = (x_0, y_0, z_0) \quad V_1 = (x_1, y_1, z_1)$ Once a point P is found to be contained in a polygon using the above method, the point is projected to the plane of the polygon. Since the projection is always in the direction of the −Z axis, the projection is trivial. Only the z value of the initial supplied point is changed since it is projected in the −Z direction. The new z value, $Z_{out}$, is the initial value, $Z_{in}$, plus the distance of the input point from the plane divided by the cosine of the angle between the plane normal and the projection vector. Since the projection vector is (0,0,−1), the cosine of the angle is simply −c, where the parameters for the plane equation are (a,b,c,d) and the unit normal of the plane, $N_p$, is (a,b,c).

$$z_{out} = z_{in} - \frac{(ax_{in} + by_{in} + cz_{in} + d)}{c}$$

Of course, if $z_{in}$ were 0, the equation simplifies to:

$$z_{out} = -\left(\frac{ax_{in}}{c} + \frac{by_{in}}{c} + \frac{d}{c}\right)$$

Normally, a projection calculation requires normalizing the projection direction vector $\overline{dir}$, taking the dot product of $\overline{dir}$ and the plane normal $N_p$, and scaling $\overline{dir}$ by dist/$\overline{dir} \cdot N_p$.dist is the distance of $z_{in}$ to the plane. This is eight times as many multiplies and four times as many adds. Although this is a substantial savings in computation cycles, this calculation rarely needs to be done more than once per intersection check, unless there are many overlapping polygons.

In summary, a system for quickly finding a point in a virtual environment "on the ground" or beneath another point involves finding the intersection of a potentially large number of "ground" polygons representing the terrain with a single ray representing the direction of gravity from the initial point. Selecting the appropriate polygons for the intersection calculation involves organizing the polygons that must be examined and performing the calculation in a way that minimizes calculation time. After appropriate polygons are selected, they are intersected with the gravity vector to determine which ones are just under the point in question, with the closest point being returned as the ground point. In one embodiment, polygons are sorted into a variable depth quadtree structure, where the leaves contain a predetermined maximum number of polygons, with each quadtree node being subdivided based on a polygon vertex located inside the current quadtree node. After the creation of the quadtree, a planar space subdivision of each quadtree node is created using the edges of the polygons that overlap the node. In general, the system for rapid ground point determination intersects lines of a predetermined orientation, e.g., gravity, with a terrain model and uses a preprocessing step that reduces the 3D terrain to a 2D projection and then sorts terrain polygons into a quadtree, followed by adding bounding boxes and polygon edge parameters to speed up polygon containment checking, with the system also being useful in collision detection such that two objects not in the same or adjacent quadtree leaves cannot be colliding and in determining containment of graphical objects in a predetermined volume which is described by polygons in a quadtree.

BRIEF DESCRIPTION OF THE DRAWINGS

These and other features of the subject invention would be better understood taken in conjunction with the Detailed Description in conjunction with the Drawings of which:

FIG. 1B is a diagrammatic representation of a point on the wheel of the bicycle of FIG. 1A in which the point in question is to be located on the path by projecting the point along the local vertical corresponding to the gravitational vector passing through the point in question on the wheel and intersecting the path;

FIG. 2 is a diagrammatic representation of the projection of the path and terrain of FIG. 1 onto a plane which is perpendicular to the direction of the gravitational force;

DETAILED DESCRIPTION

Figure 1A:
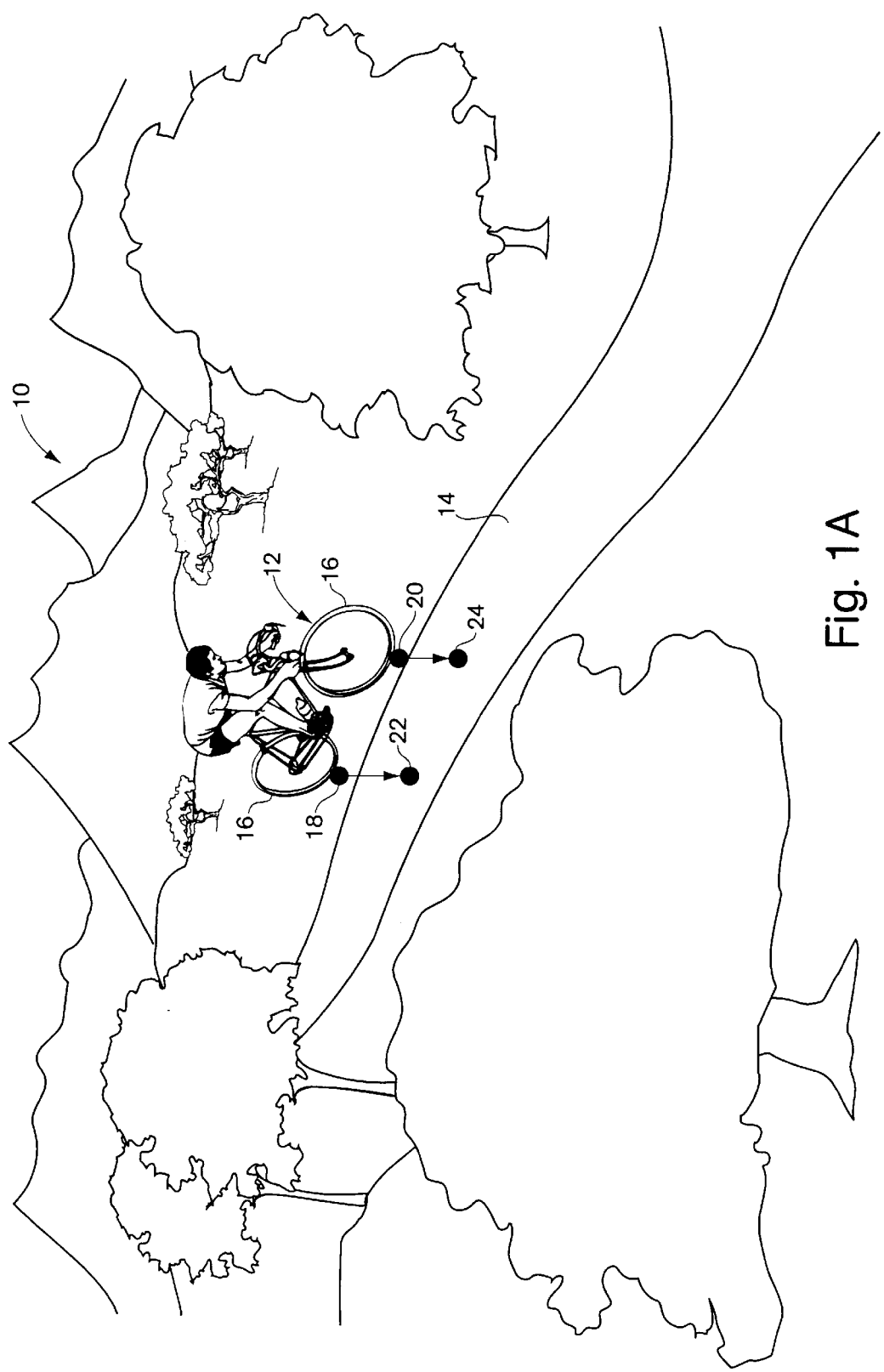
FIG. 1A is a diagrammatic representation of the placement of a bicycle on a path in a virtual reality environment in which it is desired that the wheels of the bicycle be represented as contacting the path.

Referring now to FIG. 1A, a virtual reality scene 10 is depicted in 3D which a bicycle 12 is to be located on a path 14, crossing the terrain 15 with the graphical object representing the bicycle having been previously generated, and with the only task remaining to locate this graphical object on the appropriate surface as if gravity were being applied to it.

The task therefore is to be able to locate the surface on which the wheels 16 of bicycle 12 are to rest. In general, the virtual reality scene is made up of polygons each having a surface, with the object of the subject invention to locate that polygon on which a wheel is to rest. As can be seen, points 18 and 20 at the bottom of each wheel are those points which need to rest on that point on the surface 22 and 24 which are on the designated path.

As can be seen from FIG. 1B, point 20 is directly above point 24 on path 14 with the dotted arrow 26 indicating the local gravitational vector passing through point 20.

Figure 1C:
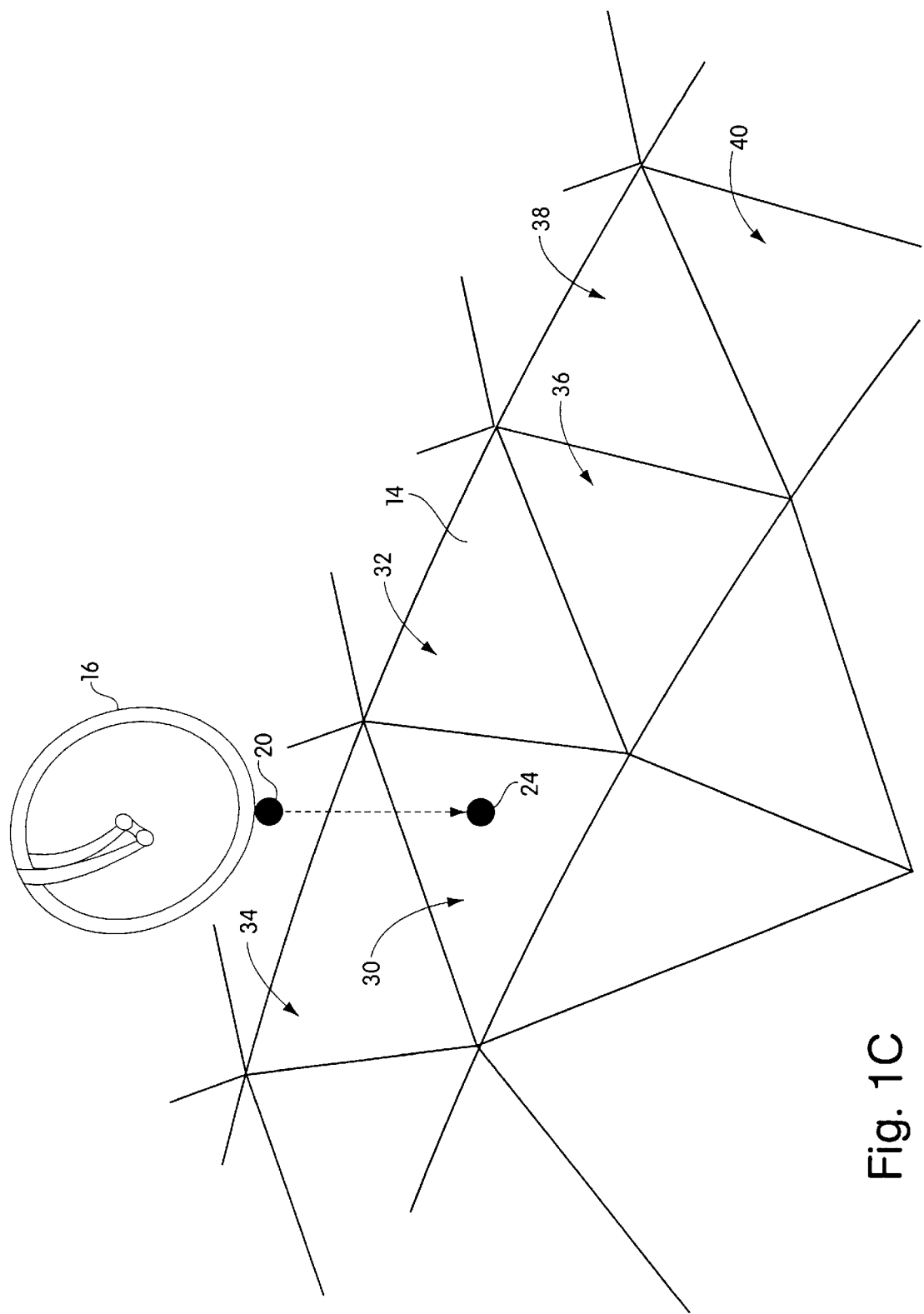
FIG. 1C is a diagrammatic representation of a portion of the path of FIG. 1B in which the path is created through the utilization of polygons, in this case, triangles.

As can be seen from FIG. 1C point 24, the desired point of contact of wheel 16 on path 14 is that point within polygon 30 which is illustrated. Other polygons 32, 34, 36, 38, and 40 are those which make up a portion of path 14 as well as the rest of the virtual reality environment. It is the purpose of the subject invention to move the graphical object to the appropriate position in the virtual reality scene by establishing a gravitational vector through the lowermost point on the graphical object and to ascertain its intersection with the plane of the appropriate polygon. As will be described, how to do this efficiently is of paramount importance as analyzing some 13,000 polygons in a typical case on a polygon by polygon basis would require more than a minute for each frame of the virtual reality scene.

Figure 3:
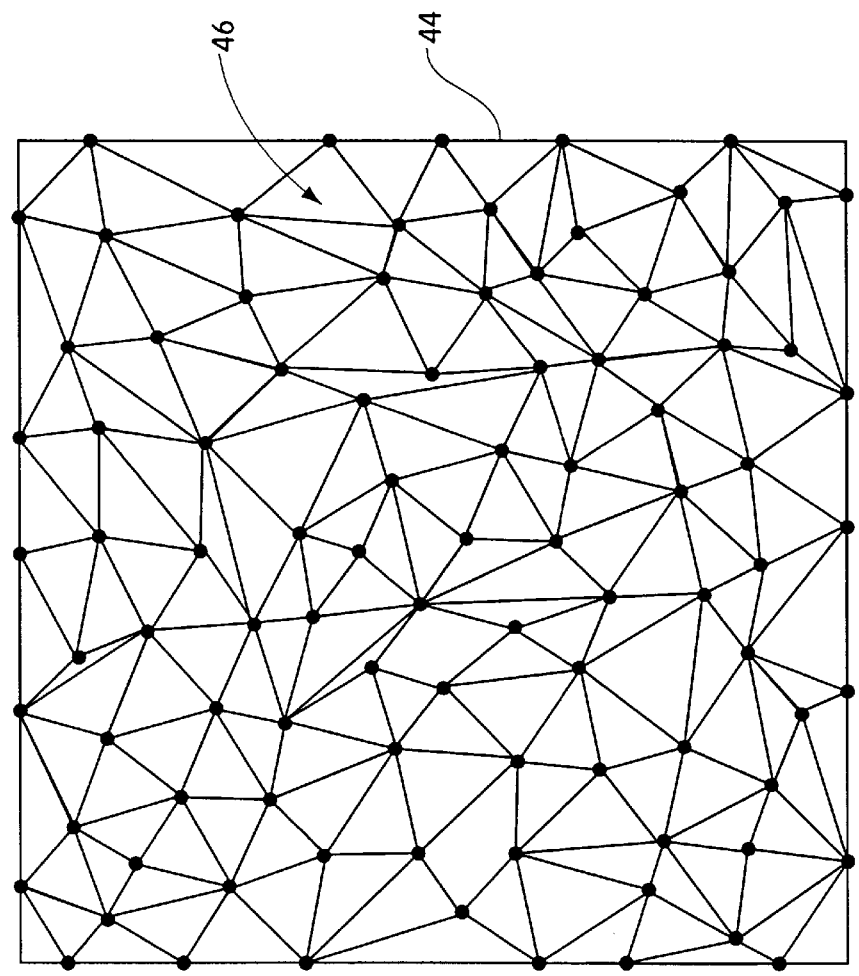
FIG. 3 is a diagrammatic representation of the projection of the polygons representing the virtual reality environment onto a 2 dimensional plane to reduce the complexity of the intersection calculations by reducing a 3-dimensional system to 2-dimensions.

While it is part of the subject invention to utilize the gravitational vector and its passage through the lowest point on the graphical object to contact a surface in the virtual reality scene in order to rapidly determine this point of contact, the 3D version of the virtual reality scene, shown at 42 in FIG. 2, is reoriented to make the gravity vector point in the −Z direction and the polygons are projected onto the XY plane as illustrated at 44., The result as illustrated by polygons 46 in plane 44 of FIG. 3 show that the terrain of a virtual reality scene can be described through utilization of a number of polygons. Thus, FIG. 3 is an overhead view of the polygons as projected onto the XY plane.

Figure 4:
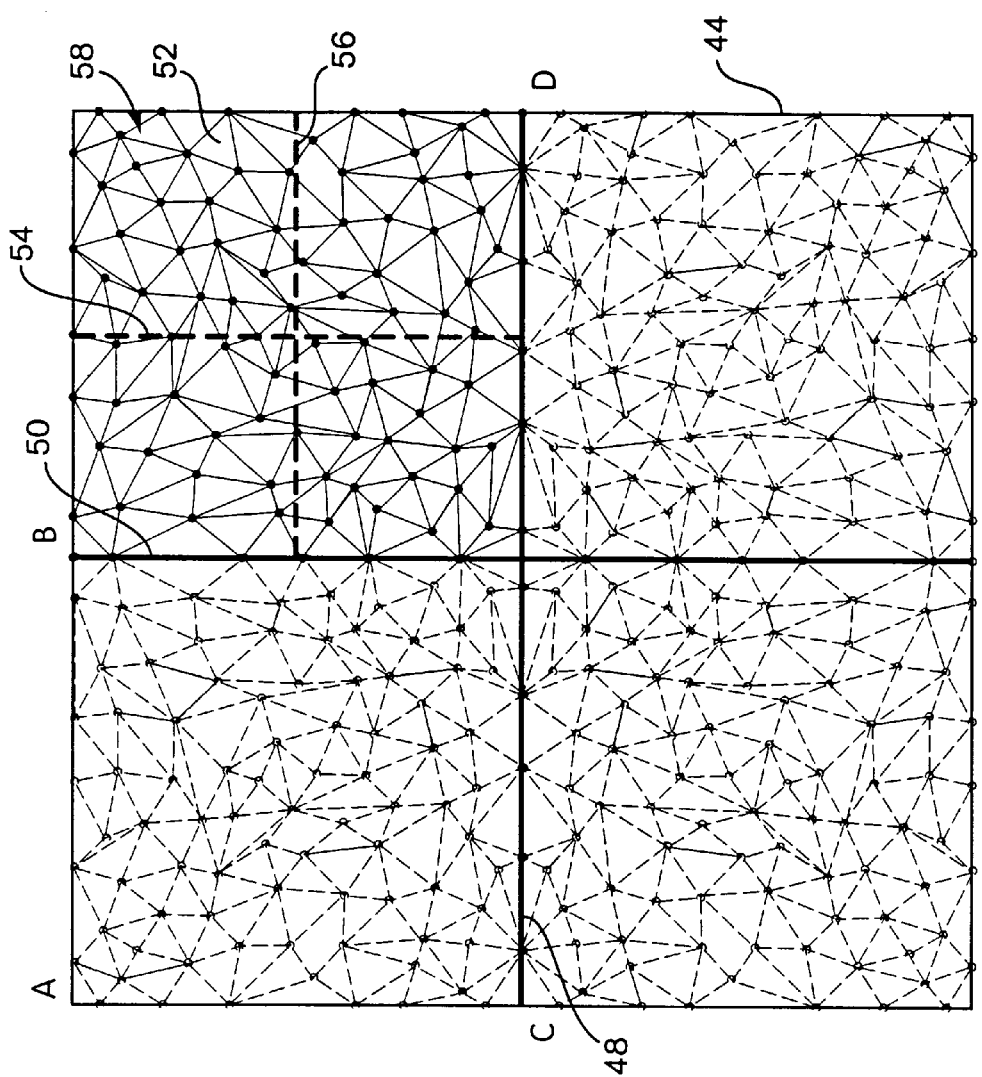
FIG. 4 is a diagrammatic representation of subdivisions of the projection of FIG. 3 indicating the selection of the upper right quadrant.
Figure 5:
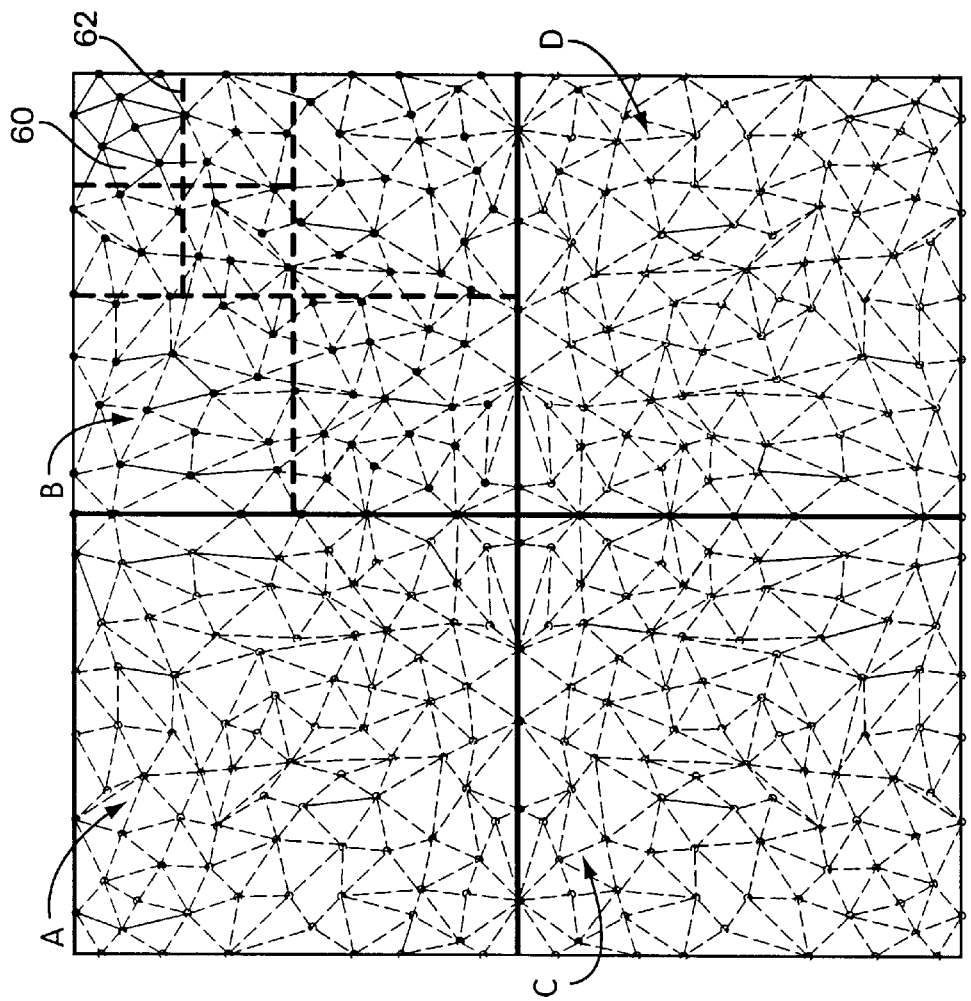
FIG. 5 is a diagrammatic representation of a further subdivision of the selected quadrant of FIG. 4 indicating a series of progressively smaller quadrants of the initial projection.

Referring now to FIG. 4, terrain 44 is divided up into four sections of approximately equal area as illustrated by lines 48 and 50 which are referred to as quadrants of a so-called quadtree structure which refers to a hierarchical structure where each child quadrant covers one quarter of the area of the parent quadrant, the root quadrant being the largest and being at the top of the tree. As can be seen, the upper right quadrant 52 can be further subdivided as illustrated by lines 54 and 56 to provide four additional quadrants, with these quadrants constituting a lower level. As can be seen from FIG. 5, the upper right quadrant 58 of FIG. 4 can be further subdivided into quadrants by lines 60 and 62 to provide a yet further subdivision and a yet further lower level.

Figure 6:
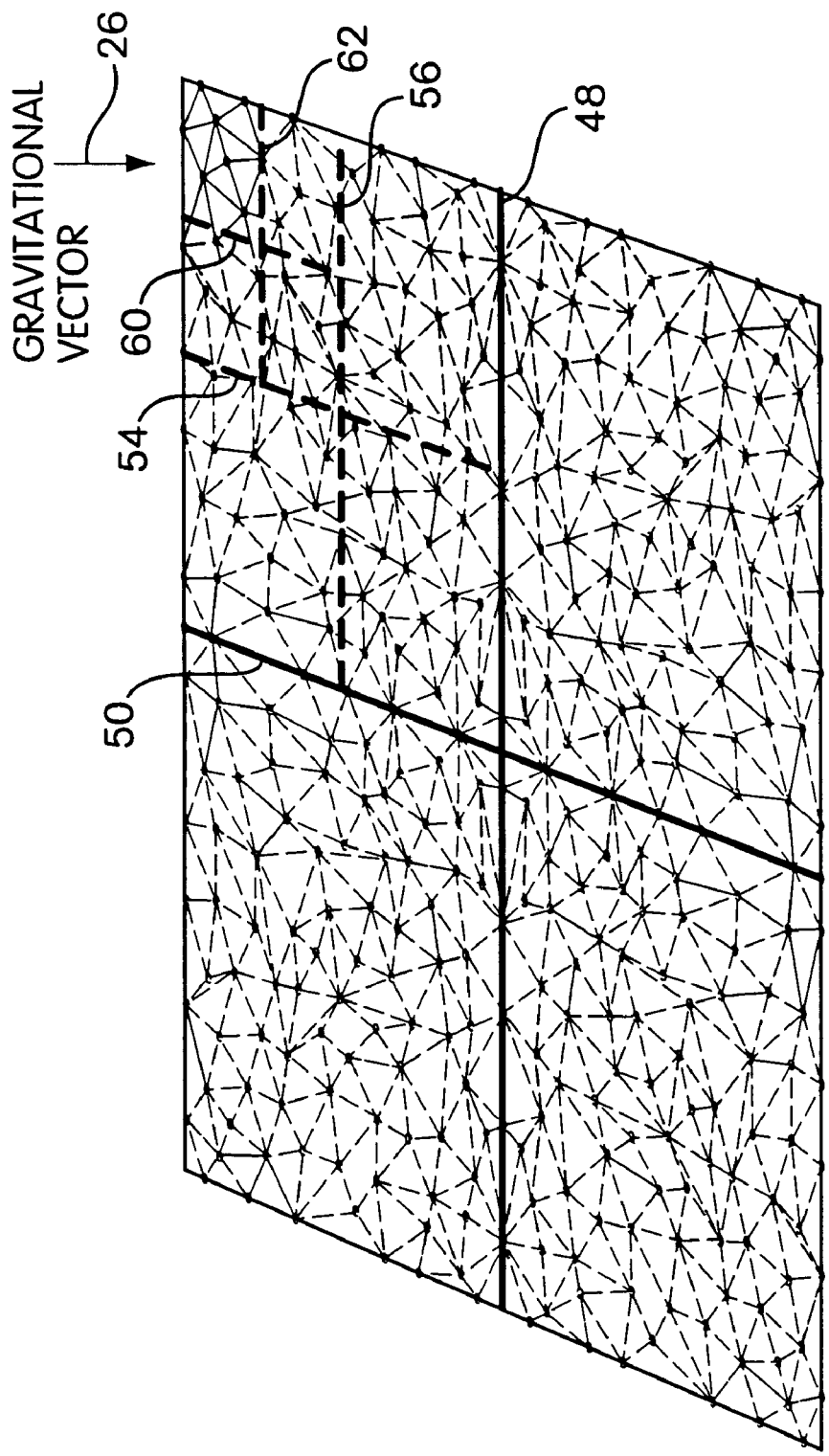
FIG. 6 is an isometric diagram illustrating the gravational vector of FIG. 1A as it might intersect the projection of FIG. 3 assuming tha the bicycle wheel was to land on the path in the upper right quadrant of the projection.

Dividing each quadrant into smaller quadrants allows a separation of the polygons into smaller groups which can be used to more quickly determine the intersection of the gravity vector with a particular polygon. As illustrated in FIG. 6, the gravitational vector 26 can only intersect a polygon which overlaps the quadrant containing vector 26. Thus, one can eliminate the need to compute potential intersections with all polygons completely outside of the chosen quadrant, substantially accelerating the intersection calculation.

In operation, once having designated a point on the graphical object which is to contact the terrain, one compares the X, Y value of that point with the quadtree dividing lines, such as lines 48 and 50, to determine which quadrant is directly below the point as established by the gravitational vector. Once the lowest quadrant level is reached, meaning the level with the fewest possible polygons or covering the smallest area, the gravitational vector originating at the point can be intersected with each remaining polygon in this quadrant to establish the polygon directly below the point. At this time, the graphical object can be translated down and located at the intersection point.

Figure 7:
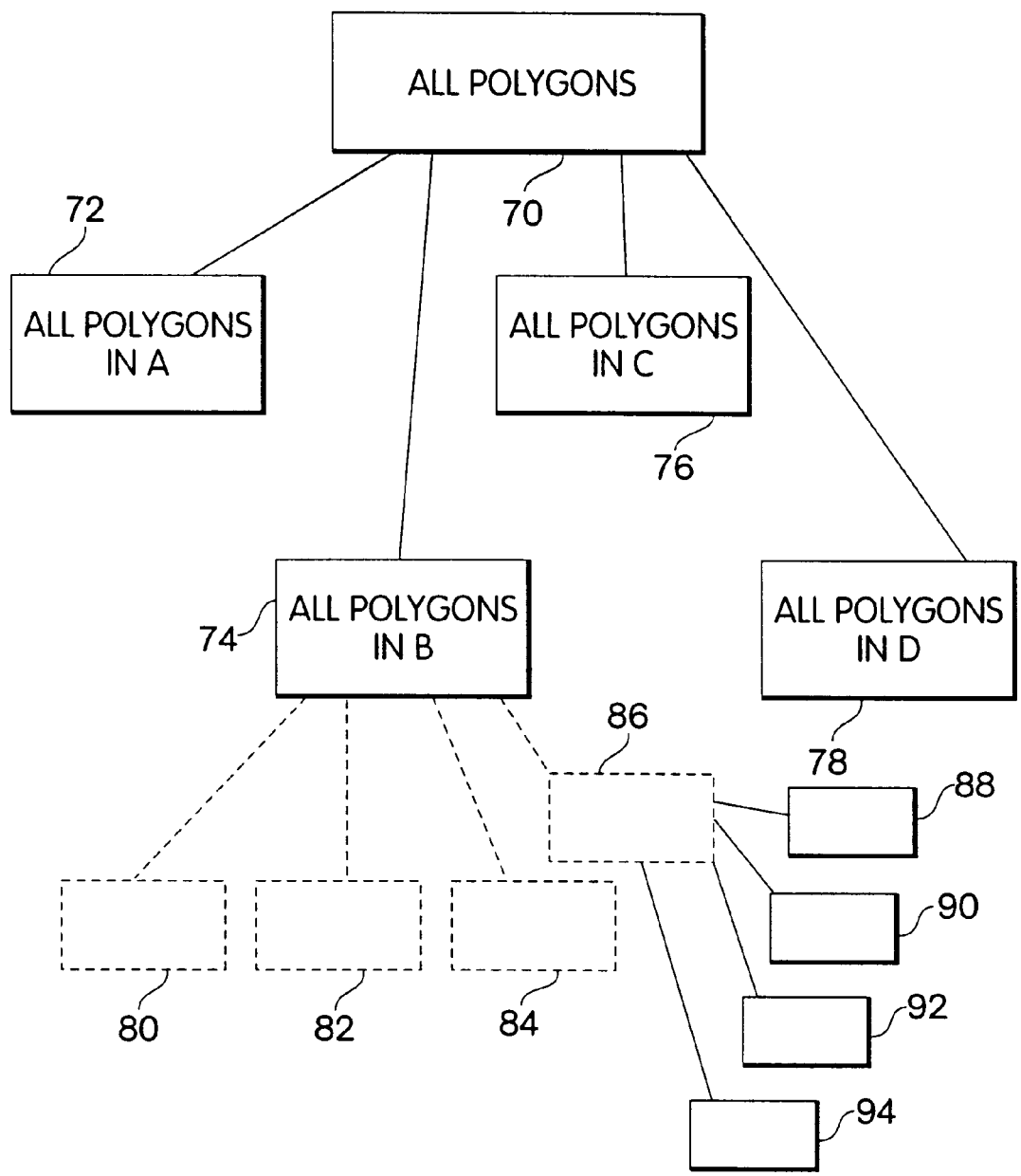
FIG. 7 is a block diagram indicating the progression necessary to finally decide which polygon is that polygon which is intersected by the gravitational vector of FIG. 1A, in which the system, in one embodiment, starts with the quadtree node containing all polygons in the projection, and successively descends one level at a time deciding which subnode to enter based on the separating lines in the quadtree, by comparing whether the intersection is above or below, to the right or to the left, of the lines forming the quartering of the projection.

Referring now to FIG. 7, another view of the quadtree structure is shown. The top box 70 shows the root quadtree node without showing the polygons contained in that node. The purpose of this diagram is to show the relationship of the parent quadrants to the child quadrants. Each child covers an area ¼ the size of its parent and usually contains less than half as many polygons. For instance, referring back to FIG. 5, quadrant A, a child of the root or top level of the tree contains about ¼ as many polygons as the top level and covers exactly one fourth of the area of the XY plane. From all of the polygons in the top level, those contained in A or overlapping A are listed with quadrant A as illustrated at 72. Quadrant B contains about one fourth of the total number of polygons in the scene as does quadrants C and D as illustrated respectively at 74, 76, and 78. It will be appreciated that quadrants A, B, C, and D make up one level of of the quadtree. As illustrated in dotted outline, additional levels can be defined by further subdividing a quadrant, in this case quadrant B, such a lower level is indicated by dotted boxes 80, 82, 84, and 86, with even further levels defined by boxes 88, 90, 92, and 94.

By way of further example, although interactive virtual environments usually do not have a full physically-based simulation of gravity, they often include a simplified simulation of the effects of gravity. In particular, they often require that a mobile object, such as a user's avatar, must follow the terrain, remaining in contact with the ground at all times. In addition to providing greater realism, this has the advantage of reducing the user's navigation problem from 6 degrees of freedom to only 3. A user can move in 2 dimensions on the terrain and rotate, but the elevation, pitch and roll are constrained by the terrain.

Terrain contact points can be straightforwardly determined using standard collision detection algorithms. However, these algorithms are relatively expensive. Many virtual environments avoid this expense by utilizing a flat terrain with a constant altitude everywhere. This makes terrain following trivial, but lacks realism.

Experience with a virtual reality park suggests that a complex and varied terrain provides significantly increased interest and realism for the participants. To allow the use of a complex terrain without incurring unreasonable computational costs, the Quick Oriented Terrain Algorithm, QOTA, was developed as part of a scalable platform for large interactive networked environments.

The key insight that leads to an efficient solution for terrain following is that while a terrain model specifies a surface in 3D space, it is essentially 2D in nature in that it can be viewed as a 2D map marked with heights. More specifically, it is assumed that like other 3D models, a terrain model is composed of polygons. However, while a terrain model may contain tens of thousands of polygons, a ray parallel to the gravity vector will intersect only a single polygon, or in the case of an overhang, at most a couple of polygons.

This implies that determining where a falling object will hit a terrain can be done in two steps. The first step determines which polygon or polygons the object might possibly strike and can done purely in two dimensions. The second step determines the height of the intersection point by doing more general intersections with only a very small number of polygons.

In the first step, it is important to realize that the goal is to discard the huge number of polygons the object cannot possibly strike as rapidly as possible. The subject system does this by sorting the polygons into an axis-aligned quadtree. Using this representation, the subject system can zero in on a small number of relevant polygons using very few simple comparisons.

A second insight is that in an interactive virtual environment, terrain following will be repetitively applied to a given object many times per second. This means that the object will only move a small distance between calculations and any errors induced by basing intersections on a preferred orientation instead of on the actual direction of motion will be slight.

For example, one could use the following alternative approach to positioning a simulated car on a virtual road. First, it is assumed that the car was previously positioned on the road and has just been moved by only a small amount in X and/or Y. One can use this motion to estimate the new X-Y positions of the bottoms of the four wheels and then determine the corresponding Z values. The wheels are then moved up or down as appropriate. Because this may change the tilt of the car, this may cause the X-Y positions of the wheels to change as well, which can lead to errors in the final Z positioning. However, because the original change in X-Y position was small, the change in tilt must be small and the resulting errors must be small.

Externally, the subject system represents a terrain as a list of convex polygons. The terrain formed by combining the polygons can be arbitrarily complex. In particular, the polygons can overlap and there can be holes caused by gaps between the polygons. The polygon list can be an entire graphic model or for greater efficiency, just the part of the model that corresponds to the ground.

When the polygons are read into memory, they are sorted into a quadtree representation for rapid access. This preprocessing takes less than two seconds for 10,000 polygons. Once preprocessing is complete, the terrain data can be repeatedly accessed very rapidly.

In addition to the terrain, the user specifies a preferred orientation called the 'gravity vector', the direction the objects fall toward the terrain. The first step of preprocessing transforms the coordinate system used to represent the polygons so that the gravity vector is aligned with the negative Z axis. The use of a transformed coordinate system allows the subject system to accommodate any arbitrary gravity vector while using axis aligned computations in its internal operations. In one embodiment, the 3×3 rotation matrix R used to accomplish this, and its inverse, are saved so that they can be used to convert back and forth between the virtual environment coordinate system and the terrain-following coordinate system, when the terrain data is accessed.

Once the gravity vector has been aligned with the Z axis, the polygons are projected onto the X-Y plane. The contents of the data structure used to represent a polygon are summarized in Table 1.

The next step in the process is building a quadtree structure in which each leaf of the quadtree contains the polygons that intersect the area enclosed by the leaf. The resulting quadtree nodes contain the data shown in Table 2.

The nodes in the quadtree are either leaves in which case they contain a list of the polygons that intersect the BBox of the leaf or they are non-leaf nodes in which case they specify two axis-aligned cut lines that divide the node into four child nodes. To minimize memory usage, the quadtree structure contains only one copy of each polygon. Polygons are referred to by pointers from every quadtree leaf that intersects them.

TABLE 1

Polygon data structure.

| Data | Description |
| --- | --- |
| BBox | 2D axis-aligned bounding box |
| Vertices | Vertices of polygon |
| Lines | List of 2D line equations |
| plane | 3D Plane equation |

TABLE 2

Data stored in quadtree node.

| Data | Description |
| --- | --- |
| BBox | 2D axis-aligned bounding box |
| Xdiv, Ydiv | X and Y division points |
| Child[4] | Child nodes |
| PolyList | Polygons intersecting leaf |

The quadtree for a list of polygons is constructed recursively as follows. Initially, all the polygons are placed in a single leaf node, the root node. The BBox for the root node is then computed by traversing the list of vertices and computing the minimum and maximum X and Y values.

The algorithm then continues by selecting leaves containing many polygons and breaking them up into smaller leaves that, on average, contain fewer polygons. This process is controlled by two parameters Maxpoly and Maxdepth. Maxpoly specifies the desired upper limit on the number of polygons in any one leaf. Maxdepth specifies a maximum allowed depth in the quadtree created.

The quadtree continues to grow as long as there is any leaf node N that contains more than Maxpoly polygons and is at less than Maxdepth in the quadtree. If there is such a node, it is converted into a non-leaf node with four leaf-node children as follows.

X and Y values are chosen to divide the BBox of N into quadrants and stored in Xdiv and Ydiv. In one embodiment, this is done by creating four equally sized quadrants. This is simple and quite effective. However, using a better division technique could create a more balanced and otherwise more optimal result.

Once the child nodes have been created, N is converted into a non-leaf node and each polygon that was in N is placed in each child that it intersects.

Figure 8A:
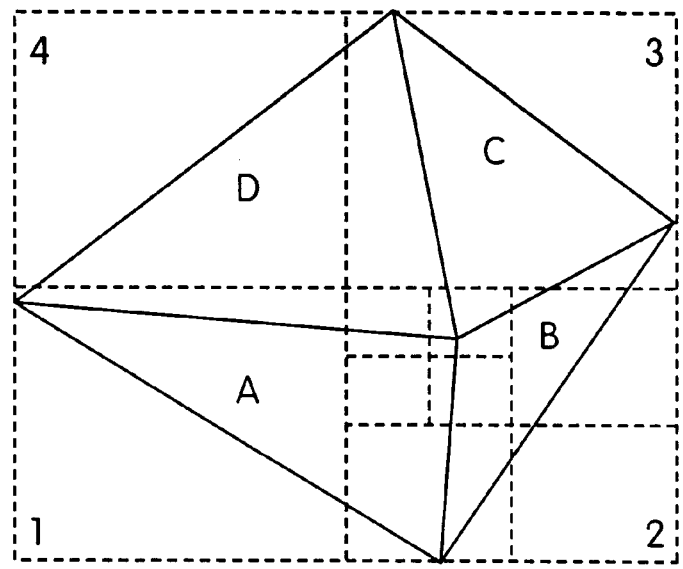
FIG. 8A is a diagrammatic representation of a simple terrain such as that depicted in FIG. 3 in which polygons A, B, C, and D form a simple 3 dimensional terrain overlapping a subdivided quadtree, with the quadtree being subdivided where there are more than 3 polygons existing within the boundary of the quadtree area.
Figure 8B:
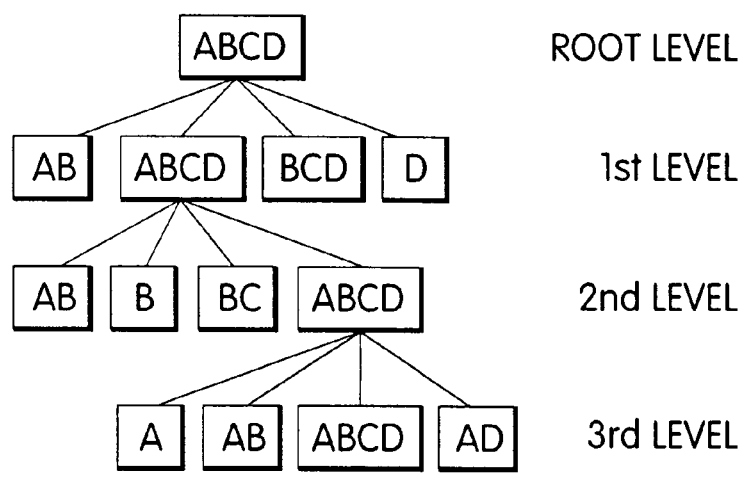
FIG. 8B is a diagrammatic representation of the quadtree levels formed by the subdivision of the polygons of FIG. 8A in which, at each level, starting with the quadtree node which covers the entire terrain, the quadtree is quartered and the polygons which overlap each quarter are listed at that level, with those quads having more than some maximum number of polygons and greater than some minimum size continuing to be subdivided and the polygons listed with the corresponding quad.

The quadtree construction process is illustrated in FIGS. 8A and 8B, which shows a four-polygon terrain converted into a quadtree with Maxpoly=3 and Maxdepth=3. Note that using the simple cut-line selection algorithm above, it is likely that there will always be a node containing all four polygons no matter how great a depth is allowed. However, as the depth increases, the area covered by quadtree leaves containing four nodes drops, and therefore it becomes less and less likely that determining a given terrain intersection point will require considering all four polygons. Note, the only way to avoid having a leaf node containing all four polygons is to choose cut lines that pass through the vertex shared by the polygons.

Once a QOTA quadtree has been created, the Z value corresponding to an X-Y point P can be very rapidly determined in three steps as follows. Note that if the gravity vector in the virtual world is not parallel to the Z axis, the rotation matrix R used when creating the quadtree is applied to convert the terrain intersection request into the form above.

The first step is to search the quadtree to determine which leaf node P is in. This is extremely fast, because two simple comparisons suffice to determine which child contains a given point in a non-leaf node (see Table 3). One consequence of the high speed of this step is that it is not very important that the simple algorithm above does not lead to a well balanced quadtree, but rather to one where areas with many small polygons have more quadtree leaves than those with larger polygons.

TABLE 3

Number of floating point operations per calculation for terrain oriented following.

| Operation | compare | add | mult |
|---|---|---|---|
| Find quadtree child | 2 | 0 | 0 |
| BBox containment | 1 to 4 | 0 | 0 |
| Line equation eval | 1 | 1 | 2 |
| Intersect with plan | 0 | 2 | 2 |

Once the right quadtree leaf has been found, the polygons in the leaf are checked to see which polygons (if any) contain the point P. For each polygon, this is done in two steps. First, a fast check of the polygon's BBox, see Table 1, is done to determine whether the position might possibly be in the polygon. If it might be, then line equations corresponding to the edges of the polygon are used to determine whether the point P is in fact in the polygon.

There is a line equation for each of the polygon's edges. Given two consecutive vertices $V_1=(x_1,y_1)$ and $V_2=(x_2,y_2)$ going counterclockwise around the polygon, the equation is $Ax+By=-C$ where $A=y_2-Y_1$, $B=x_1-x_2$, and $C=x_2y_1-x_1y_2$.

The polygon interior, which must be convex, is the intersection of the negative half planes specified by the line equations for the polygon. That is to say if $Ax+By$ is greater than $-C$ for any of the line equations then P is not contained in the polygon.

Figure 9:
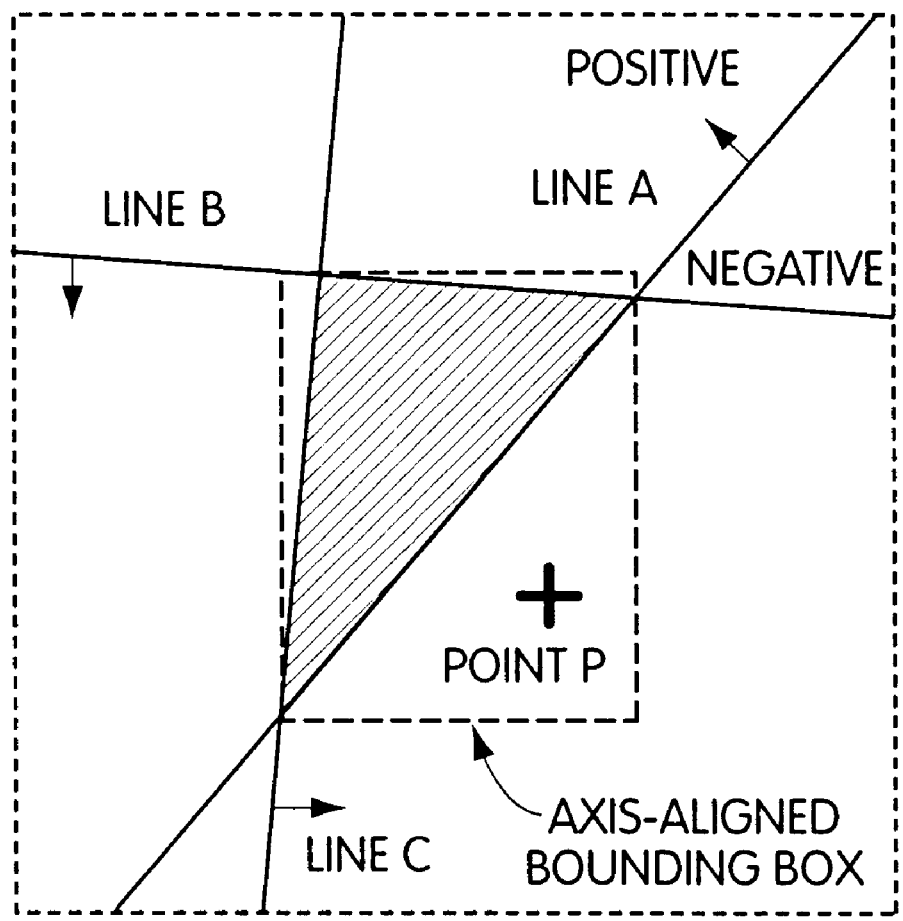
FIG. 9 is a diagrammatic representation of a bounding box and edge lines for determining whether a point is inside a given polygon which overlaps the quad.

The above method for determining whether a point is in a polygon is illustrated in FIG. 9. The dotted line around the figure is the BBox of a quadtree leaf, which contains parts of 7 polygons which are not shown. One of these polygons, shaded gray, is a triangle. The figure shows the BBox of the triangle and its three line equations. The point P is in the bounding box, but is on the negative side of line equation A. Once a point P is found to be contained in a polygon, the Z value of the corresponding 3D point on the polygon is calculated by solving the plane equation for the polygon. Specifically, if the plane the polygon is in is defined by the equation $ax+by+cz+d=0$, then for a given X and Y, $Z=-(a/c)X-(b/c)Y-(d/c)$.

It may be the case that a given input point P intersects no polygons or several. In the first situation, an indication is returned that P does not correspond to any part of the terrain. In the latter case, it is typically most useful to return either the nearest point below a specified starting Z value, or the nearest point above this value, or both. If the gravity vector in the virtual world is not parallel to the Z axis, then the inverse of the rotation matrix R used when creating the quadtree is applied to convert the results into tje coordinate system of the virtual environment.

TABLE 4

Statistics on virtual reality park quadtrees.

| Max poly | Max depth | Num nodes | Megabytes of RAM used | Avg tests |
|---|---|---|---|---|
| 400 | 5 | 105 | 1.1 | 319.0 |
| 16 | 12 | 6394 | 1.7 | 9.3 |
| 12 | 12 | 9069 | 1.9 | 7.2 |
| 8 | 14 | 17865 | 2.6 | 5.2 |

Table 4 illustrates the effect of using different values of Maxpoly and Maxdepth when creating the subject quadtree. It summarizes four different quadtrees created for the 13,346 polygon outdoor terrain for a virtual reality park. As Maxpoly is reduced, the number of quadtree nodes and therefore the amount of memory required rises rapidly, but the average number of polygons per leaf node falls. This is essentially a time-space tradeoff since traversing the quadtree is much faster than checking the containment of a point in a polygon.

The most interesting number in Table 4 is the last column. It shows the expected number of polygon containment tests that need to be performed when assessing a single terrain data point. This is the average number of polygons in a leaf, weighted by the areas of the BBox of the leaves. As Maxpoly is reduced, one eventually reaches a state of diminishing returns where the extra memory required is not justified by the small additional reductions in the average number of polygon containment tests.

Figure 10:
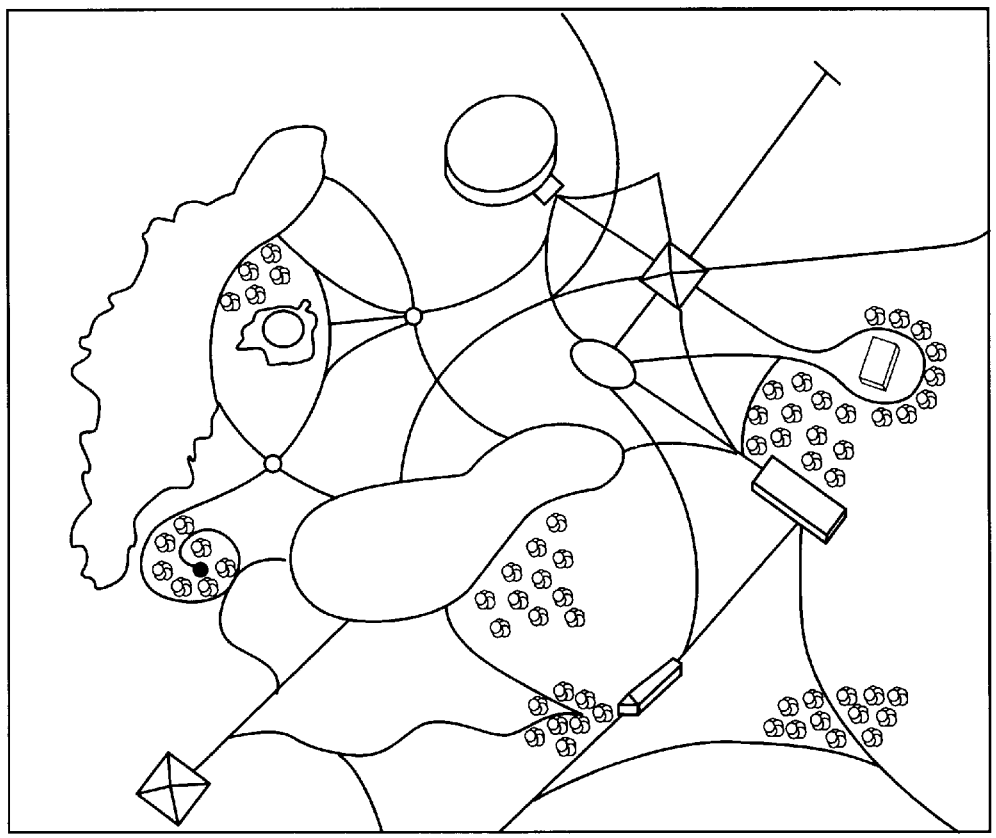
FIG. 10 is a diagrammatic representation of a virtual reality scene, in this case, a scene in Diamond Park; and, FIG. 11 is a portion of the quadtree created using the quick oriented terrain algorithm of the Subject Invention on the scene of FIG. 10.
Figure 11:
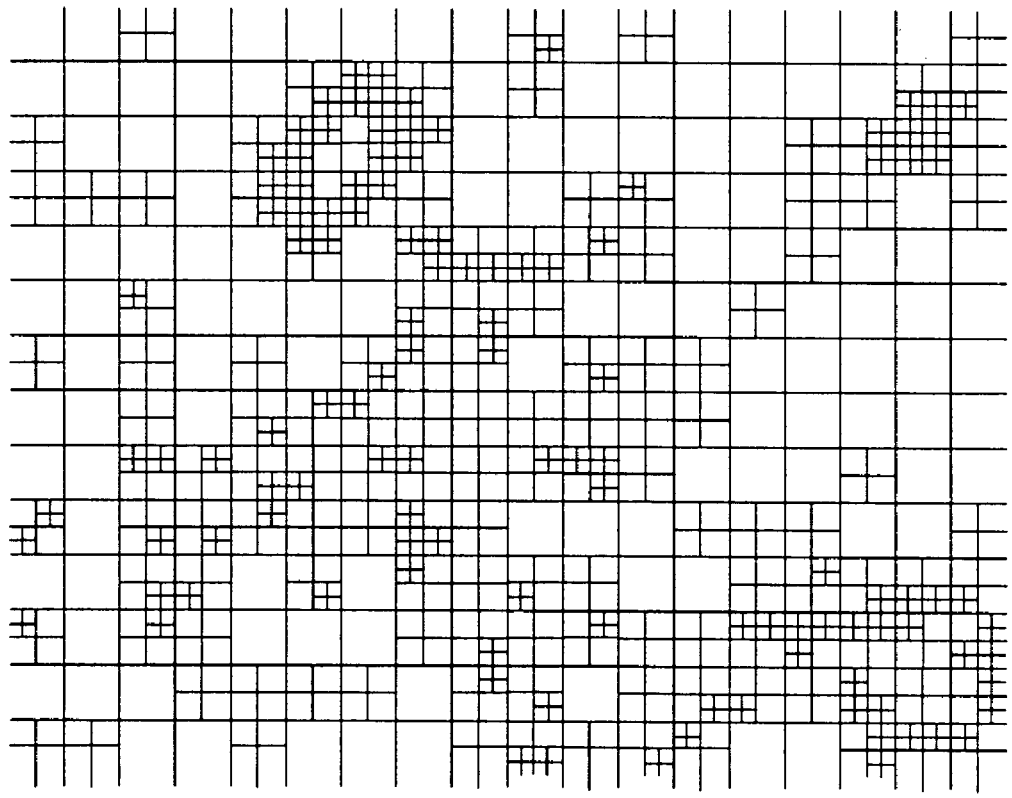

FIG. 10 is a bird's eye view of a virtual reality park. The picture shows the terrain and the buildings on the terrain. FIG. 11 shows the corresponding portion of the Maxpoly=12 and Maxdepth=12 quadtree for the terrain. In the figure, the BBox of each leaf is drawn as a square. The level of gray used to draw the square indicates the number of polygons in the leaf, with light gray indicating a large number of polygons, e.g., near 12, and dark gray indicating a small number of polygons, e.g., near 1. It can be seen that much smaller quad nodes are needed in complex areas of the scene such as the edge of the oval building in the upper left and near the looping path in the lower right.

Many people creating virtual environments on Silicon Graphics workstations use the Iris Performer toolkit. This library includes a set of subroutines for high-speed collision detection. These routines support the efficient intersection of arbitrary line segments with the geometry in the environment and are often used for terrain following.

TABLE 5

Comparison of QOTA and Performer.

|  | Performer | QOTA |
|---|---|---|
| Avg intersect time | 1881 | 19 |
| Avg no intersect time | 1892 | 13 |

As can be seen, Table 5 compares the subject system or QOTA with the collision detection algorithm in Performer version 1.2. The test was done on a 250 MHz R4400 MIPS processor using the 13,346 polygon virtual reality park terrain with QOTA operating on a quadtree with Maxpoly= 12 and Maxdepth=12. In this terrain, the raw polygon data corresponds to a gravity vector aligned along negative Z, so no rotations are needed when determining terrain intersections.

The numbers in Table 5 are the times in microseconds required to determine a single terrain intersection point. The first line shows the average time required to determine an intersection point when there is one. The second line shows the average time required to determine that there is no intersection point when none exists. QOTA works particularly well in this latter situation.

When you consider that Performer's collision detection algorithm is more general than QOTA and therefore doing a fundamentally harder task, it is not surprising that QOTA is many times faster. The fundamental reason for this is that while QOTA's interface is basically the same, intersecting lines with the polygons, QOTA demands that all the lines be parallel to a particular preselected direction and preprocesses the data to make intersections with lines parallel to this direction very fast.

Another difference between Performer collision detection and QOTA is that Performer operates on the actual polygons used for graphical display. This saves memory in comparison to QOTA's use of an entirely different data structure. However, it runs the risk of involving more polygons than necessary in terrain following. In Table 5, QOTA and Performer are applied to exactly the same data. In addition, it is worthy of note that with distributed virtual environments, the computer running a simulation is not necessarily the same as the machine running the graphical display of the environment. As a result, it can be beneficial that QOTA operates on a data structure that is separate from the graphical data used to generate images.
Comparing QOTA with fast collision detection algorithms in general it is interesting to note that the basic approach to efficiency in these algorithms is very similar in spirit to the approach used by QOTA. In particular, bounding boxes and space-dividing data structures are used to rapidly eliminate data that is irrelevant to determining a particular collision point. Further, there is a fundamental reliance on spatial and temporal coherence. The key reason why QOTA is faster is that it attacks a simpler problem, which can be reduced almost entirely to 2D operations instead of 3D operations.

Although designed primarily for terrain following, the subject system can be used for a variety of additional tasks. For example, in one application, the subject system is used for a restricted kind of collision detection and the fast determination of 3D containment, in addition to terrain following.

The subject system can be used for detecting simple collisions with fixed obstacles by creating terrains with holes in them. If an object attempts to move into one of these holes, the subject system can rapidly determine that the object is no longer over the terrain and the application can react by refusing to let the object enter the hole. For example, one application uses the subject system to determine when users attempt to enter these holes and prevents them from doing so. As a result, users cannot go through walls or enter the lakes.

To provide for scalability, virtual worlds are divided into chunks called locales. As objects move about in the virtual world, it is important to detect when they leave the boundary of one locale and move into another. This determination is done using the subject system.

Each locale is associated with a terrain model. This is used for terrain following in the locale. However, it is also used to determine whether a given point is or is not in the locale. This is done by designing the boundary of the locale's terrain so that it matches the boundary of the locale. In addition, a description of the ceiling of the locale is provided either by adding extra polygons to the terrain object representing the floor or in a separate terrain object. The subject system is then used to determine not only whether there is a floor polygon below a given test point, but also whether there is a ceiling polygon above the test point. If both polygons exist, then the test point is within the 3D volume specified by the locale. Otherwise, it is not.

A program listing for the subject system can be found in Appendix A attached hereto.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. In a virtual reality environment, in which a virtual reality scene having a 3D terrain with a surface representing ground is displayed on a computer monitor under control of a computer, a system for quickly finding a point on said terrain representing ground so as to permit the location of a graphical object thereon, comprising:

means for characterizing said terrain in terms of polygons;
   means for defining as said point the intersection of a ray representing the direction of gravity with the surface of one of said polygons, thus to establish a point on said terrain at which said graphical object is to be located if a point on said graphical object is to rest on said ground; and,
   means for selecting a subset of said polygons to be examined for the intersection of said ray, thus to eliminate the necessity for examining all polygons making up said terrain, said selecting means including means for rotating said 3D terrain in accordance with a preferred direction and for projecting said rotated terrain into a 2D plane.

2. The system of claim 1, wherein said selecting means further includes means for sorting said polygons into a variable depth tree structure where the leaves of said tree contain a predetermined maximum number of polygons.

3. The system of claim 2, wherein said tree structure includes nodes and wherein each node can be subdivided into further subnodes.

4. The system of claim 3, wherein said subnodes are the result of subdividing each of said nodes into approximate quarters by orthogonal lines to provide a quadtree structure.

5. The system of claim 4, wherein said polygons have vertices and wherein each of said nodes is subdivided into subnodes such that at least one of said orthogonal lines passes through a polygon vertex.

6. In a virtual reality environment, in which a virtual reality scene having a 3D terrain with a surface representing ground is displayed on a computer monitor under control of a computer, a system for quickly finding a point on said terrain representing ground so as to permit the location of a graphical object thereon, comprising:

means for characterizing said terrain in terms of polygons;

means, for defining as said point the intersection of a ray representing the direction of gravity with the surface of one of said polygons, thus to establish a point on said terrain at which said graphical object is to be located if a point on said graphical object is to rest on said ground; and, means for selecting a subset of said polygons to be examined for the intersection of said ray, thus to eliminate the necessity for examining all polygons making up said terrain, said selecting means including means for initially providing a quadtree structure including means for loading the polygons representing said terrain into computer memory, means for listing all ground polygons, means for providing a gravity vector as said ray, means for transforming said list of ground polygons until the gravity vector which is transformed the same way is aligned with the −Z axis of a 2D space having an XY plane, means for projecting each transformed polygon on said XY plane, means for building a quadtree structure having leaves defined by a predetermined area, in which leaves of said quadtree contain only polygons whose 2D projection overlaps the area enclosed by the corresponding quadtree leaf and in which each 2D polygon projection is characterized by a bounding box corresponding to the part of the 2D polygon in the corresponding leaf.

7. The system of claim 6, wherein said quadtree leaves have orthogonal dividing lines and further including means for traversing said quadtree structure by proceeding down by level to a leaf containing the appropriate polygon, said initial point traversing means including means for comparing the X,Y value of said point with said quadtree dividing lines to determine which quadtree leaf is directly below said point.

8. The system of claim 7 and further including means, having provided a subset of polygons per leaf, for checking if said point is in the bounding box of the 2D projection of each polygon, means responsive thereto for checking if the said point is in the corresponding 2D polygon, and means for calculating the intersection of said ray with the polygon itself.

* * * * *